(12) United States Patent  
Jiang (10) Patent No.: US 12,509,090 B2  
(45) Date of Patent: Dec. 30, 2025

(54) IMAGE-BASED LOCALIZATION MODULE (71) Applicant: SHENZEN GUDSEN TECHNOLOGY CO., LTD, Shenzhen (CN)

(72) Inventor: Yu Jiang, Wellesley, MA (US)

(73) Assignee: SHENZHEN GUDSEN TECHNOLOGY CO., LTD., Shenzhen (CN)

( * ) Notice: Subject to any disclaimer, the term of this patent is extended or adjusted under 35 U.S.C. 154(b) by 295 days.

(21) Appl. No.: 18/210,475

(22) Filed: Jun. 15, 2023

(65) Prior Publication Data

US 2023/0322232 A1    Oct. 12, 2023

Related U.S. Application Data

(63) Continuation of application No. PCT/US2021/064098, filed on Dec. 17, 2021.

(60) Provisional application No. 63/127,278, filed on Dec. 18, 2020.

(51) Int. Cl.
*B60W 40/06* (2012.01)
*B60W 50/16* (2020.01)
*G06V 10/764* (2022.01)
*G06V 20/56* (2022.01)
*B60W 50/14* (2020.01)

(52) U.S. Cl.
CPC ............ *B60W 40/06* (2013.01); *B60W 50/16* (2013.01); *G06V 10/764* (2022.01); *G06V 20/588* (2022.01); *B60W 2050/146* (2013.01); *B60W 2552/10* (2020.02); *B60W 2556/35* (2020.02)

(58) Field of Classification Search
CPC ................. B60W 30/12; G06V 20/588; G06T 2207/30256; B60T 2201/08; B60T 2201/081; B60T 2201/085; G01C 21/3658; G01C 21/3819
See application file for complete search history.

(56) References Cited

U.S. PATENT DOCUMENTS

2017/0144669 A1* 5/2017 Spata ...................... E01C 23/01
2019/0204092 A1* 7/2019 Wheeler ................ G05D 1/021
2021/0122379 A1* 4/2021 Choi ................. B60W 50/0205

OTHER PUBLICATIONS

International Preliminary Report on Patentability on PCT Appln. PCT/US2021/064098 Dtd Jun. 29, 2023.
International Search Report and Written Opinion on PCT Appln. PCT/US2021/064098 Dtd Mar. 2, 2022.

* cited by examiner

*Primary Examiner* — Kenneth J Malkowski
(74) *Attorney, Agent, or Firm* — Chethan Srinivasa; Foley & Lardner LLP (57) ABSTRACT

Systems and methods of performing localization of a vehicle are provided. The system receives data comprising one or more of: raw images from one or more vision sensors, motion sensor data, or lane-level map information. The system determines, based on the data, a lane in which the vehicle is located and lateral displacement of a center of the vehicle relative to a center of the lane.

18 Claims, 4 Drawing Sheets

IMAGE-BASED LOCALIZATION MODULE

CROSS-REFERENCES TO RELATED APPLICATIONS

This application claims the benefit of priority under 35 U.S.C. § 120 as a continuation of International Patent Application No. PCT/US2021/064098, filed Dec. 17, 2021, which claims the benefit of priority under 35 U.S.C. ¶119 to U.S. Provisional Patent Application No. 63/127,278, filed Dec. 18, 2020, titled "IMAGE-BASED LOCALIZATION MODULE," each of which is hereby incorporated herein by reference in its entirety.

BACKGROUND

Vehicles can be equipped with global positioning systems to locate the vehicles on the road. The global positioning systems control systems can receive signals from satellites indicating the location of the satellite. The global positioning systems can calculate distances from the satellites to determine an approximate location of a vehicle.

SUMMARY

This technical solution is directed systems, methods, and apparatus of image-based localization. Due to the technical challenges of localizing a position of a vehicle, as global positioning systems (GPSs) may lack the accuracy or resolution, the GPS may not provide reliable or an exact position of the vehicle on the road. For instance, the GPS may provide a general location of the vehicle in a region and a route traversing by the vehicle. However, the GPS may lack the capability to identify which lane the vehicle is on or how many lanes are on the specific road in which the vehicle traverses. Further, the GPS may provide outdated or inaccurate information and may not indicate irregularities on the road.

Hence, the technical solution discussed herein can include a location module that can receive various sensor data from components of a vehicle to determine a location of the vehicle, including, for example, a lane of a road in which a vehicle traverses and a lateral displacement from the center of the lane. The location module can determine and provide a longitudinal localization of the vehicle by correlating live road profile to predetermined road profile. Further, the location module can detect any irregularity, such as a pothole, manhole, speed bump, among other obstructions to alert an operator or user. Thus, the systems and methods of this technical solution can receive sensor data, including raw images, motion sensor data, or lane-level map information, to determine a lateral and longitudinal location of a vehicle with improved accuracy, resolution, and reliability, and alert users of detected irregularities to improve the driving experience, longevity of the vehicle, and safety of the operators.

At least one aspect is directed to a system to perform localization of a vehicle. The system can include a data processing system comprising one or more processors and memory. The data processing system can execute a localization module. The localization module can receive data comprising one or more of: raw images from one or more vision sensors, motion sensor data, or lane-level map information. The localization module can determine, based on the data, a lane in which the vehicle is located and lateral displacement of a center of the vehicle relative to a center of the lane.

In some implementations, the data processing system can use a vision detection technique to detect markers of the lane, the vision detection technique comprising at least one of image segmentation or deep learning. The data processing system can receive the motion sensor data comprising at least one of: angular velocity and linear acceleration measured at a center of gravity of the vehicle; a vehicle speed; or acceleration measured at one or more wheels of the vehicle.

The data processing system can receive the lane-level map information comprising at least one of: a number of lanes on the road, a geometry of central lines of the lane indicating a curvature or width, or a style of a marker of the lane indicating at least one of a color of the marker, dashed marker, solid marker, or width of the marker.

The data processing system can fuse the received data using a Kalman filter to determine the lane. The data processing system can fuse the received data using a multi-sensor data fusion technique to determine the lane.

The data processing system can provide, for presentation via a display device of the vehicle, an indication of the lane determined by the data processing system. The data processing system can provide, for presentation via a display device of the vehicle, a map of road profiles for the lane and one or more additional lanes of the road.

The data processing system can determine a longitudinal localization based on a correlation of a live estimated road profile and a predetermined road profile of the lane loaded from a map. The data processing system can detect one or more irregularities of the live estimated road profile or the predetermined road profile, the one or more irregularities comprising at least one of a pothole, a manhole, or a speed bump. The data processing system can classify the one or more irregularities into one or more severity levels. The data processing system can present an alert to a user of the vehicle indicating the one or more irregularities and the corresponding one or more severity levels, the alert comprising at least one of a visual alert, an audio alert, or a haptic alert.

At least one aspect is directed to a method of performing localization of a vehicle. The method can include a data processing system receiving data comprising one or more of: raw images from one or more vision sensors, motion sensor data, or lane-level map information. The method can include determining a lane in which the vehicle is located and lateral displacement of a center of the vehicle relative to a center of the lane.

The method can include using, by the data processing system, a vision detection technique to detect markers of the lane, the vision detection technique comprising at least one of image segmentation or deep learning. The method can include receiving, by the data processing system, the motion sensor data comprising at least one of: angular velocity and linear acceleration measured at a center of gravity of the vehicle; a vehicle speed; or acceleration measured at one or more wheels of the vehicle.

The method can include receiving, by the data processing system, the lane-level map information comprising at least one of: a number of lanes on the road, a geometry of central lines of the lane indicating a curvature or width, or a style of a marker of the lane indicating at least one of a color of the marker, dashed marker, solid marker, or width of the marker. The method can include fusing, by the data processing system, the received data using a Kalman filter to determine the lane. The method can include fusing, by the data processing system, the received data using a multi-sensor data fusion technique to determine the lane.

The method can include providing, by the data processing system for presentation via a display device of the vehicle, an indication of the lane determined by the data processing system. The method can include providing, by the data processing system for presentation via a display device of the vehicle, a map of road profiles for the lane and one or more additional lanes of the road.

The method can include determining, by the data processing system, a longitudinal localization based on a correlation of a live estimated road profile and a predetermined road profile of the lane loaded from a map. The method can include detecting, by the data processing system, one or more irregularities of the live estimated road profile or the predetermined road profile, the one or more irregularities comprising at least one of a pothole, a manhole, or a speed bump. The method can include classifying, by the data processing system, the one or more irregularities into one or more severity levels. The method can include presenting, by the data processing system, an alert to a user of the vehicle indicating the one or more irregularities and the corresponding one or more severity levels, the alert comprising at least one of a visual alert, an audio alert, or a haptic alert.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, systems, methods, and apparatus for vehicle localization. The various concepts introduced above and discussed in greater detail below may be implemented in any of numerous ways.

The present disclosure is directed to systems, methods, and apparatus for image-based localization. The system can include a vehicle having a location module (e.g., sometimes referred to as a localization module or a data processing system) including one or more processors and memory. The vehicle can include one or more sensors to collect input data, such as raw images from vision sensors, motion sensor data, or lane-level map information. Based on the input data received from the sensors, the location module can determine at least the number of lanes on the road, the lane occupied by the vehicle, and the relative lateral displacement of the vehicle from the center of the respective lane. The location module can localize the vehicle using a localization technique, such as a Kalman filter or based on a multi-sensor data fusion technique, method, or process.

The vehicle can include one or more onboard software components for previewing the road profile or highlighting any irregularity on the vehicle path. The road profile can be a portion of a map with detailed road information, such as the number of lanes on the road, width of individual lanes, lane marking, traffic signs, the speed limit for the particular road, curvature of the road, smoothness of the road, among others. The vehicle (e.g., the location module) can generate a live road profile using the one or more sensors of the vehicle. The location module can correlate the live road profile to a predetermined or stored road profile to determine the longitudinal location of the vehicle. The location module can highlight, alert, or indicate the irregularity on the road to the driver or passenger including the severity level of the irregularity. Thus, the systems and methods of the technical solution can improve lateral and longitudinal localization of the vehicle, and provide a real-time alert to irregularities on the road, thereby improving safety and driving experience for the driver and passengers.

Figure 1:
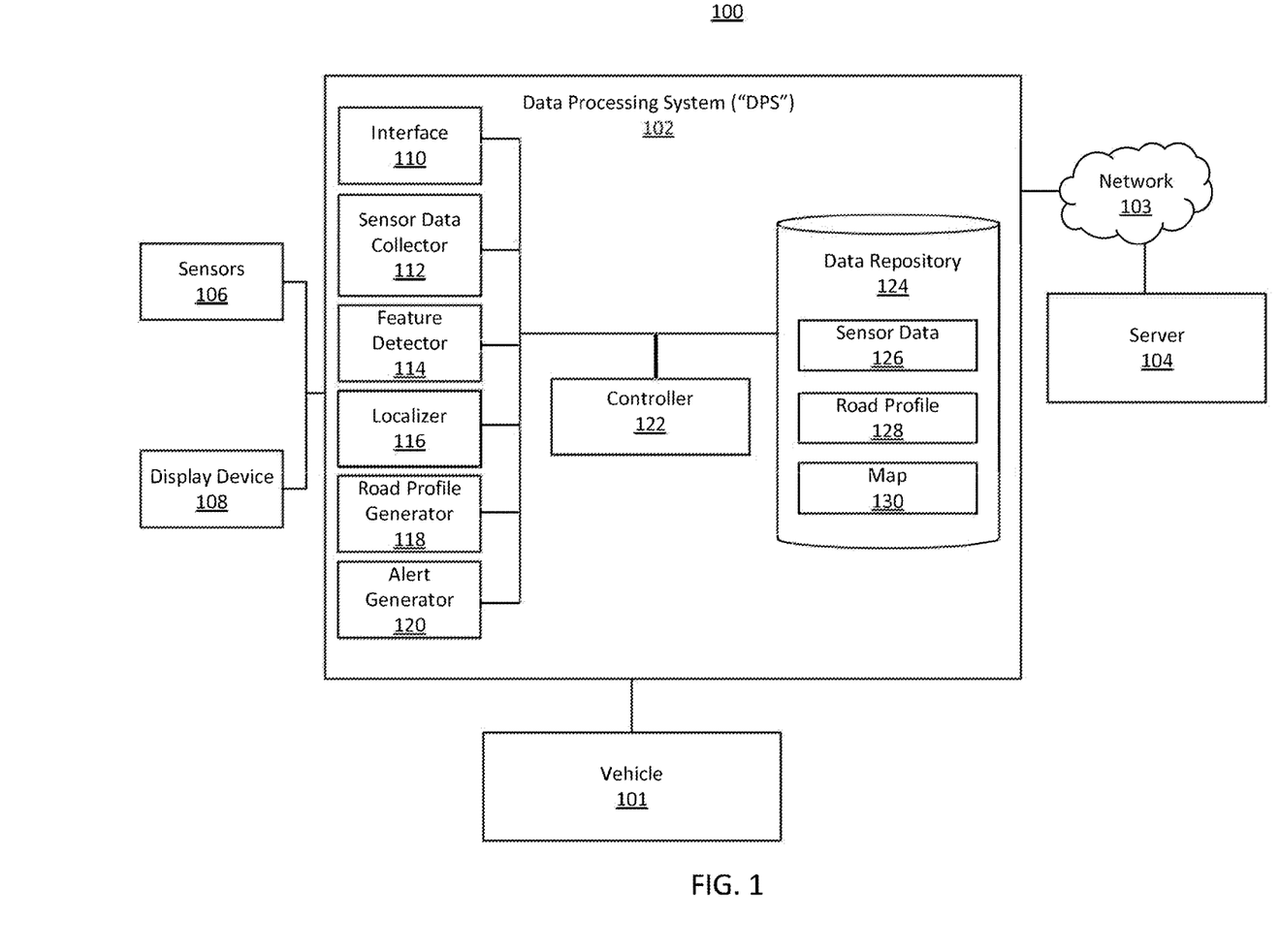
FIG. 1 is a block diagram of an example system for image-based localization, in accordance with an implementation.

Referring now to FIG. 1, a block diagram of an example system for image-based localization is shown. The system 100 can include a vehicle 101, a data processing system ("DPS") 102 electrically connected to the vehicle, a network 103, and a server 104. The system 100 can include multiple sensors 106 and at least one display device 108 electrically connected to the vehicle 101 and the DPS 102. The system 100 can include multiple vehicle systems electrically connected to the vehicle 101 and the DPS 102. In some cases, the DPS 102 can control one or more components of the vehicle 101, such as suspension systems, braking systems, steering systems, among other systems to assist drivers on the road. The DPS 102 can connect to the server 104 via the network 103. Connection to the server enables the DPS 102 to upload data (e.g., data packets, information, and files) to and download data from the server 104. In some implementations or situations, the DPS 102 may not be connected to the server 104, for example, for vehicle localization based on information local to the vehicle 101.

The one or more components (e.g., vehicle 101, DPS 102, network 103, server 104, sensors 106, or display device 108) of the system 100 can be one or more separate components, a single component, or a part of each other. The one or more components of the system 100 can be composed of hardware, software, or one or more combinations of hardware and software. The one or more components of the system 100 in connection with the vehicle 101 can be implemented in or connected to one or more vehicles different from the vehicle 101. In other words, one or more vehicles can include components similar to components of the system 100 connected to the vehicle 101. The one or more vehicles can operate similar to the vehicle 101. The operation includes data collection, processing, transmission, reception, etc. The one or more vehicles may include different configurations from the vehicle 101, such as make, model, track width, or type of vehicle 101. Data from the vehicle 101 can be processed by the DPS 102 or the server 104 for localization and irregularity detection. For example, the vehicle 101 can collect and process sensor data.

The vehicle 101 can be equipped with at least a suspension system, a braking system, and a steering system to assist drivers on the road. The vehicle 101 can include one or more sensors 106, such as at least one ranging sensor, accelerometer, gyroscope, range sensor, tilt sensor, velocity sensor, positioning sensor, inertial measurement unit ("IMU"), imaging sensor (e.g., vision sensor), infrared sensor, among others. The sensors 106 can be used to collect data internal or external to the vehicle 101. Internal data may include, for instance, fluid temperature, engine temperature, exhaust gas emission, vehicle motion (e.g., velocity, acceleration, tilt, angular velocity or acceleration, torque, among others), RPM, etc. External data may include, for instance, raw images of the road, lane information, signs or markings on the road, weather conditions, etc.

The sensors 106 can be mounted or embedded in any part of the vehicle 101. For example, the vision sensors or imaging sensors can be mounted in front, at the back, or the sides of the vehicle, such as near the headlight, the windshield, or the hood of the vehicle, the trunk, the roof, or the side mirrors, among other positions or locations. The sensors 106

The vehicle 101 can include at least one display device 108. The display device 108 can be embedded or mounted inside the vehicle 101. The display device 108 can be mounted at the dashboard or other location accessible by the driver of the vehicle 101. A pad or other mounting component can be used to mount the display device 108 in the vehicle 101. The driver or operator can operate and visualize collected sensor data via the display device 108. The display device 108 can be a touchscreen device with interactive elements for drivers to operate. The display device 108 can display at least one notification in response to receiving an alert from the DPS 102. The alert can include irregularity detection or warning for the driver, such as to aid the driver in navigating the road. In some cases, the alert can include updates to a software component of the system 100 or a request to upload collected data stored in the memory of the vehicle 101 to the server 104. The display device 108 can be used by the user to download information from the server 104, such as a map or road profiles stored on the server 104. In some cases, the display device 108 can be used to download information collected by other vehicles and processed by the respective vehicles or the server 104. In some cases, the display device 108 can be used to upload information from the vehicle 101 for cloud storage or processing on the server 104. In this case, the vehicle 101 can download processed data from the server 104 for localization and irregularity detection, among other features or functions.

The network 103 can include computer networks such as the Internet, local, wide, metro or other area networks, intranets, satellite networks, other computer networks such as voice or data mobile phone communication networks, and combinations thereof. The network 103 may be any form of computer network that can relay information between the one or more components (e.g., the DPS 102, vehicle 101, or server 104) of the system 100. The network 103 can relay information between the DPS 102 and one or more information sources, such as web servers or external databases, amongst others. In some implementations, the network 103 may include the Internet and/or other types of data networks, such as a local area network (LAN), a wide area network (WAN), a cellular network, a satellite network, or other types of data networks. The network 103 may also include any number of computing devices (e.g., computers, servers, routers, network switches, etc.) that are configured to receive and/or transmit data within the network 103. The network 103 may further include any number of hardwired and/or wireless connections. The DPS 102 can communicate wirelessly (e.g., via WiFi, cellular, radio, etc.) with the server 104 via the network 103. In some cases, the DPS 102 can communicate wireless with other vehicles or DPSs (among other devices) via the network 103.

The server 104 can include, be, or be referred to as a node, remote devices, remote entities, application servers, cloud, remote data processing system, or backend server endpoints. The server 104 may be one of multiple servers on the network 103 of the system 100. The server 104 can be composed of hardware or software components, or a combination of both hardware or software components. The server 104 can communicate with the DPS 102, which may be an intermediary device or component to transfer the collected data from the sensors 106 to a server 104, for example. The server 104 may include one or more features or functionalities of the DPS 102, such as for processing data or providing instructions to the vehicle 101 (e.g., for controlling the vehicle 101 or alerting the driver or passenger). For example, the server 104 can receive data packets or traffic from at least the DPS 102, such as collected sensor data, generated road profile, etc. The server 104 can store the data in a remote data repository. In some cases, the server 104 may process the received sensor data to generate at least the road profile or lane-level map information, localize the vehicle, perform feature detection (e.g., detect irregularities or obstructions on the road), among others. For instance, the server 104 can perform one or more tasks or operations delegated from the DPS 102.

The DPS 102 can be included as part of the vehicle 101 for processing data and controlling the systems within the vehicle, such as the suspension system, the braking system, and the steering system. In some cases, the DPS 102 may be an independent component external to the vehicle 101. The DPS 102 can include one or more processors and memory. The DPS 102 can perform image-based localization. The DPS 102 can include or be referred to as a localization module, location module, or processing device. The DPS 102 can include at least one interface 110, at least one sensor data collector 112, at least one feature detector 114, at least one localizer 116, at least one road profile generator 118, at least one alert generator 120, at least one controller 122, and at least one data repository 124. The one or more components (e.g., interface 110, sensor data collector 112, feature detector 114, localizer 116, road profile generator 118, alert generator 120, controller 122, or data repository 124) of the DPS 102 can be composed of hardware, software, or a combination of hardware and software components. The one or more components of the DPS 102 can be independent components or part of a single component (e.g., a part of a localization module, circuit, or component).

The interface 110 can refer to a network interface card (e.g., a physical or virtual interface card). The interface 110 can interface with the network 103, devices within the system 100 (e.g., server 104 or components of the vehicle 101), or components of the DPS 102. The interface 110 can include features and functionalities of any communication interface to interface with the aforementioned components. For example, the interface 110 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 110 can include at least a built-in network adapter, network interface card, PCMCIA network card, EXPRESSCARD network card, card bus network adapter, wireless network adapter, USB network adapter, modem, or any other device suitable for interfacing one or more components within the system 100 to any type of network capable of communication. The DPS 102 can receive, transmit, or otherwise communicate data internally or externally to other components within the system 100 via the interface 110.

The sensor data collector 112 can receive data from one or more sensors 106 of the vehicle. The sensor data collector 112 can receive or collect raw image data from one or more imaging sensors (e.g., vision sensors), motion sensor data from one or more motion sensors (e.g., IMU, accelerometer, gyro sensor, etc.), and lane-level map information, for example. The raw image data can include or correspond to one or more frames of a video feed sensed by the vision sensor. The motion sensor data can include at least angular velocity data, linear acceleration data measured at the center of gravity of the vehicle, vehicle speed data, and wheel acceleration data of the vehicle.

The sensor data collector 112 can collect lane-level map information responsive to processing images or video feeds from the vision sensor (e.g., processed by the feature detector 114). In some cases, the sensor data collector 112 can receive or retrieve the lane-level map information from the server 104 or the data repository 124. The lane-level map information can include a map with lane information of the road. For example, the lane-level map information can include the number of lanes on the road, geometry of the lane central lines (e.g., curvature or width), style of the lane markers (e.g., color, dashed or solid, and width), etc. The data processing system can store the data and information within the data storage. Data collected by the sensor data collector 112 can be stored in the data repository 124. The sensor data can be used or processed by one or more components (e.g., feature detector 114, localizer 116, road profile generator 118, alert generator 120, controller 122, etc.) of the DPS 102. In some cases, the sensor data collector 112 can send the sensor data to the server 104 for processing.

The feature detector 114 can process sensor information, such as the raw image data, the motion sensor data, and the lane-level map information to determine features, items, objects, or other details on the road. For example, the feature detector 114 can process raw image data using a computer vision processing technique (e.g., computer vision operation or function). The computer vision processing technique may include at least one of image segmentation technique, deep learning technique, among other methods for processing image data to determine the lane the vehicle resides in. In some cases, the feature detector 114 can use one or more machine learning techniques configured for object recognition to process vision sensor data and determine the objects, symbols, markers, among other indications on the road.

Subsequent to processing the image data, the feature detector 114 can identify lane markers on the road as the detection results. For example, the feature detector 114 can identify at least the color (e.g., yellow, orange, white, etc.), dimension (e.g., width, length, etc.), quality (e.g., solid, scratched, fade, clear, etc.), characteristic (e.g., solid lines, broken lines, double solid lines, a combination of broken and solid lines, etc.) of the lane markers, etc. In some cases, the feature detector 114 can detect symbols, indicators, or markers on the road (e.g., painted on the road or a sign next to the road), such as markers indicating a bus lane, stop indicator, bike lane, etc. using the computer vision processing technique. The information associated with lanes on the road can be associated with or be a part of the lane-level map information.

In response to identifying lane markers on the road, the feature detector 114 can determine the lane that the vehicle 101 resides in. For example, the feature detector 114 can detect that there are three lanes on the road based on the lane markers. The feature detector 114 can determine that the vehicle 101 resides in one of the lanes based on the distance of the center of the vehicle 101 from various lane markers. The vision sensor may be positioned at the center of the vehicle (e.g., laterally or longitudinally), such that the image data is indicative of the center of the vehicle 101. In some cases, the vision sensor may not be positioned at the center of the vehicle (e.g., offset laterally or longitudinally). In this case, the feature detector 114 can apply an offset to the image data to determine the position of the center of the vehicle 101 compared to the location of the lane markers.

In some cases, the feature detector 114 can detect or identify one or more irregularities on the road. The feature detector 114 may identify the irregularities, obstructions, or hazardous items using the computer vision processing technique or other object recognition computer vision techniques. The irregularity may include a pothole, manhole, speed bump, objects, etc. The feature detector 114 can detect the dimensions, depth, or characteristics (e.g., shape, color, etc.) of the irregularities. The feature detector 114 can identify the type of irregularities using the computer vision processing technique, such as a pothole, manhole, objects (e.g., tree branch, ball, box, etc.), among others. The feature detector 114 can determine a severity level for the irregularity based on at least one of the dimensions (e.g., having a size greater than 6 inches in length, width, height, or diameter), type of object, etc. The severity level may be ranked alphabetically, numerically, symbolically, etc. In some cases, the feature detector 114 may ignore or may not categories certain objects or irregularities that would not affect the performance or health of the vehicle 101, such as potholes 4 inches or less in depth, bumps less than 3 inches in height, a paper bag, thin broken tree branch (e.g., below 3 inches in diameter), etc. based on at least the dimension or types of object.

The feature detector 114 can identify at least the lane that the irregularity resides in. For example, the feature detector 114 can detect the lane markings the object is in between. In some cases, the feature detector 114 may not classify or categorize objects outside one of the lanes on the road. In some other cases, the feature detector 114 may classify any objects hazardous to the traffic on the road (e.g., to notify the driver or road management personnel). The position of the irregularities may be determined by the feature detector 114 and the localizer 116 based on the location of the vehicle 101. For instance, the feature detector 114 can identify the distance of the irregularities from the vehicle 101, while the localizer 116 determines the lateral and longitudinal position of the vehicle 101 on a map.

The localizer 116 (e.g., localization module, lateral module, longitudinal module, or lane detector) can process the detection results from the feature detector 114 including, for instance, indications of the lane marker. The localizer 116 can use at least one localization technique (e.g., localization operation, function, or process) to process the detection results. The localization technique can include, for example, Kalman filter or other multi-sensor data fusion techniques. Utilizing the localization technique, the localizer 116 can determine the lane the vehicle is in, among other lanes on the road, such as indicated by the lane-level map information. The localizer 116 can determine the lane the vehicle 101 occupies based on the lane-level map information detected by the feature detector 114, such as the number of lanes on the road, the distance of the vehicle 101 from individual lane markers, the geometry of the lane central lines (e.g., curvature, width, etc.), lane marker styles, etc. The localizer 116 may determine the lane occupied by the vehicle 101 based on the closest lane marker(s).

The localizer 116 can determine a lateral displacement (e.g., perform lateral localization) of the vehicle 101 from the center of the lane by processing the aforementioned data using the computer vision technique or the localization technique. For example, if the vision sensor is placed at the center (e.g., laterally equidistant from either sides) of the vehicle 101, the localizer 116 can measure the lateral displacement based on the image data indicating a distance from the left and right lane markers. In some cases, the vision sensor may not be at the center of the vehicle 101. In this case, the localizer 116 may assign an offset (e.g., predetermined based on the position of the vision sensor) from the left and the right lane markers with respect to the vehicle 101.

The localizer 116 can output other information in addition to the lane or lateral displacement information, as discussed herein. The localizer 116 can store information on the lane or lateral displacement information of the vehicle 101 in the data repository 124. In some cases, the localizer 116 may retrieve certain lane-level map information from the data repository 124, such as the number of lanes on the particular road based on the area or location of the vehicle 101, the style of lane markers captured by the satellite imaging or other vehicles, etc.

In some cases, the localizer 116 can perform longitudinal localization of the vehicle 101, such as detecting the location of the vehicle 101 along the road, path, or route. For example, the localizer 116 can correlate a live road profile with a predetermined road profile for the particular lane on the road traverses by the vehicle 101. The correlation between the live road profile and the existing road profile can be referred to as comparing, matching, or differentiating between the two road profiles. The live road profile can refer to a road profile generated by the road profile generator 118 as the vehicle 101 traverses the road. The localizer 116 can receive the live road profile in real-time or responsive to receiving and processing sensor data from one or more sensors 106, such as image data, acceleration data, vibration data, data from the IMU, etc. The localizer 116 can retrieve the predetermined road profile from the data repository 124 local to the vehicle 101 or from the server 104. The localizer 116 can load or retrieve the predetermined road profile based on at least one of the approximate location of the vehicle 101, such as position data from a GPS, distance traveled from a starting point, landmarks (e.g., street name, route, etc.), signs, etc.

The localizer 116 can compare the two road profiles (e.g., live road profile and predetermined road profile) specific to the occupied lane to determine the vehicle location on the map used to load the existing road profile. The localizer 116 may identify or determine similarities or same features between the live road profile and the predetermined road profile, such as similar landmarks, vibration sensed by the one or more sensors 106 (e.g., based on the suspension, model, weight, or other specification of the vehicle 101), structures (e.g., railing, tracks, buildings, etc.) on or adjacent to the road, etc. Upon determining that the live profile matches one or more portions of the predetermined road profile, the localizer 116 can identify the longitudinal position of the vehicle 101 along the route of the map. In some cases, the localizer 116 can localize the vehicle 101 by determining the distance of the vehicle 101 from certain landmarks or structures that match (e.g., above 90% in similarity) between the live road profile and predetermined road profile. Hence, the localizer 116 (e.g., lateral and longitudinal module, component, or circuit) can perform lateral and longitudinal localization of the vehicle 101 to determine at least the lane resided by the vehicle 101, lateral displacement from the particular lane, and longitudinal position along a route.

In some cases, the localizer 116 can localize the position of any irregularities on the road with respect to the vehicle 101. For instance, in response to determining the longitudinal and lateral displacement of the vehicle 101, the localizer 116 can determine the distance of the irregularities from the vehicle 101 and the positioned lane (or in between lanes). The localizer 116 can store upload the location of the vehicle 101 to the server 104 or store locally in the data repository 124 in some cases.

The road profile generator 118 can generate a road profile based on sensor data from one or more sensors 106. For example, the road profile generator 118 can generate the road profile based on image data, acceleration data (e.g., vertical acceleration indicating bumps or texture of the road), or tilt data (e.g., indicating the slope of the road), among other information. The road profile generator 118 can generate the road profile specific to the lane occupied by the vehicle 101. For instance, three sets of road profiles can be associated with a three lanes road. For the same three lanes road, the road profile generator 118 can generate a road profile and associate the generated road profile to one of the sets based on the occupying lane. In some cases, the road profile generator 118 can retrieve existing or predetermined road profile (e.g., from a map stored locally or on the server 104) for modification based on the current generated road profile (e.g., live road profile). In some cases, in response to determining the lateral or longitudinal position of the vehicle 101, the road profile generator 118 can associate the generated road profile to the respective lateral or longitudinal position on the map. In some cases, the road profiles can correspond to segments or sections of one or more routes on the map.

In some cases, the road profile generator 118 can include or correspond to a road profile preview system, which can be part of an onboard software component of the vehicle 101. For example, the road profile generator 118 can communicate with the display device 108 of the vehicle 101 to display or preview the generated road profile to the operator or passenger. The road profile preview may include at least outlines of the road (e.g., lane marking, types of lane marking, sidewalk, curb, etc.), pedestrians, other vehicles, landmarks, signs, traffic lights, etc.

In some cases, the road profile generator 118 can generate the road profile including any irregularity detected on the road, such as in the lane traverses by the vehicle 101. In some cases, the road profile generator 118 can generate the road profile with irregularities detected on other lanes on the road. The road profile generator 118 may record or classify the irregularities to a certain severity level based on the dimension of potholes, objects, etc. For instance, a 6-inches pothole with 1 foot in circumference may be classified as a severity level 1 (e.g., low severity). The road profile generator 118 may classify a 1-foot pothole with 3 feet in circumference as severity level 2 (e.g., medium severity).

The road profile generator 118 can classify a 2 feet deep pothole with 6 feet in circumference as severity level 3 (e.g., high severity). The severity level may reflect the impact that the irregularities may have on the vehicle 101 or other vehicles. Although pothole is used as an example, the road profile generator 118 can perform similar operation to determine the severity level of the irregularities for bumps, objects, etc. In some cases, the dimensional ranges (e.g., size or dimension values) for classifying the irregularities to a severity bucket may be predetermined by the administrator of the DPS 102 or the operator of the vehicle 101. In some cases, the road profile generator 118 can classify the irregularities based on a policy or configuration predetermined by or downloaded from the server 104.

The alert generator 120 can include or correspond to an alert system, which can be part of the onboard software component of the vehicle 101. The alert generator 120 can generate an alert to indicate road irregularities to the driver or the passengers via at least one of the display device 108, steering wheel (e.g., vibration, bumps, etc.), dashboard lightings (e.g., flashes, blinks, etc.), audio system, among other components of the vehicle 101. For example, based on the comparison between the live road profile and the predetermined road profile, the alert generator 120 can determine that the vehicle 101 is traversing to an obstruction, such as a pothole, bump, etc. Accordingly, the alert generator 120 can notify or alert the driver of the irregularity by visual (e.g., display location and magnitude of the irregularity), audio (e.g., default sound set by the manufacturer or personalized sound set by the operator), or physical (e.g., vibration) indication. By alerting the operator or passenger prior to the irregularities, the alert generator 120 can enhance the safety for the driver and passengers by avoiding hazards, as well as longevity of the vehicle 101 by preventing damages. In some cases, the alert generator 120 can generate the alert based on the live road profile or real-time object recognition during the drive.

The controller 122 can control one or more systems, devices, or components of the vehicle 101. The controller 122 can control the one or more components responsive to, for instance, obstructions or irregularities on the road. The obstructions may be in the lane of the vehicle 101. For example, the controller 122 may assist the driver in steering away from an object, pothole, etc. detected by the feature detector 114 based on the live road profile or the correlation between the live road profile and the predetermined road profile. In some cases, the controller 122 may increase the braking coefficient of the vehicle 101 to enhance the braking performance.

The data repository 124 can correspond to or be referred to as a data storage, memory device, centralized repository, or data source. The data repository 124 can be local to the vehicle 101 or the DPS 102. In some cases, the data repository 124 may be an independent device capable of being decoupled from the DPS 102. The data repository 124 can be accessed by one or more components (e.g., sensor data collector 112, feature detector 114, localizer 116, road profile generator 118, or alert generator 120) of the DPS 102. In some cases, the data repository 124 may be accessed by other devices (e.g., the server 104) of the system 100 connected to the network 103. The data repository 124 can include at least one sensor data storage 126, at least one road profile storage 128, and at least one map storage 130. The data repository 124 can include other storages to store information discussed herein for localization of the vehicle 101, detecting irregularities, providing alerts, etc.

The sensor data storage 126 can include, store, or maintain data collected from the one or more sensors 106. In some cases, the sensor data storage 126 can store sensor data retrieved from the server 104, such as sensed data corresponding to a lateral or longitudinal position of the vehicle 101 on the map. The sensor data can be used for feature detection, localization, generating road profiles, the correlation between road profiles, among others. In some cases, the stored sensor data can be uploaded to the server 104.

The road profile storage 128 can include, store, or maintain road profiles of a map. The road profiles (e.g., live road profiles) can be generated from the road profile generator 118. The road profiles (e.g., predetermined or known road profiles) can be retrieved or obtained from the server 104, remote devices, or other vehicles. Individual road profiles can be specific to a lane on the road. In some cases, the road profile can include height, weight, suspension, or other information of vehicles corresponding to locations on the map. For instance, the road profile can be normalized based on the vehicle information, such that any vehicle can correlate the predetermined road profile with the respective live road profile. The road profiles can be loaded from a map, which can include data of the lane the vehicle 101 currently resides in (e.g., corresponding to the live road profile of the lane).

In some cases, the road profiles (e.g., predetermined road profiles) can be loaded from the server 104 during a drive. For instance, the predetermined road profiles can be retrieved based on the route traverses by the vehicle 101 or a navigation path selected by the operator. In some other cases, the predetermined road profiles can be loaded based on the location of the vehicle 101, for instance, loading a map with road profiles within 5 miles of the vehicle 101. In some cases, live road profiles can be used to replace or update existing (predetermined) road profiles of the specific occupied lane and vehicle location.

The map storage 130 can include, store, or maintain at least one map. The map can include various road profiles for all lanes on the road. The map can be stored locally in the data storage or in the cloud (e.g., server 104), such as in remote data storage. The map can be loaded by one or more components of the DPS 102 to retrieve the map information including existing road profiles. The map can be updated using the live road profiles generated by the road profile generator 118 based on features detected by the feature detector 114, for example.

Figure 2:
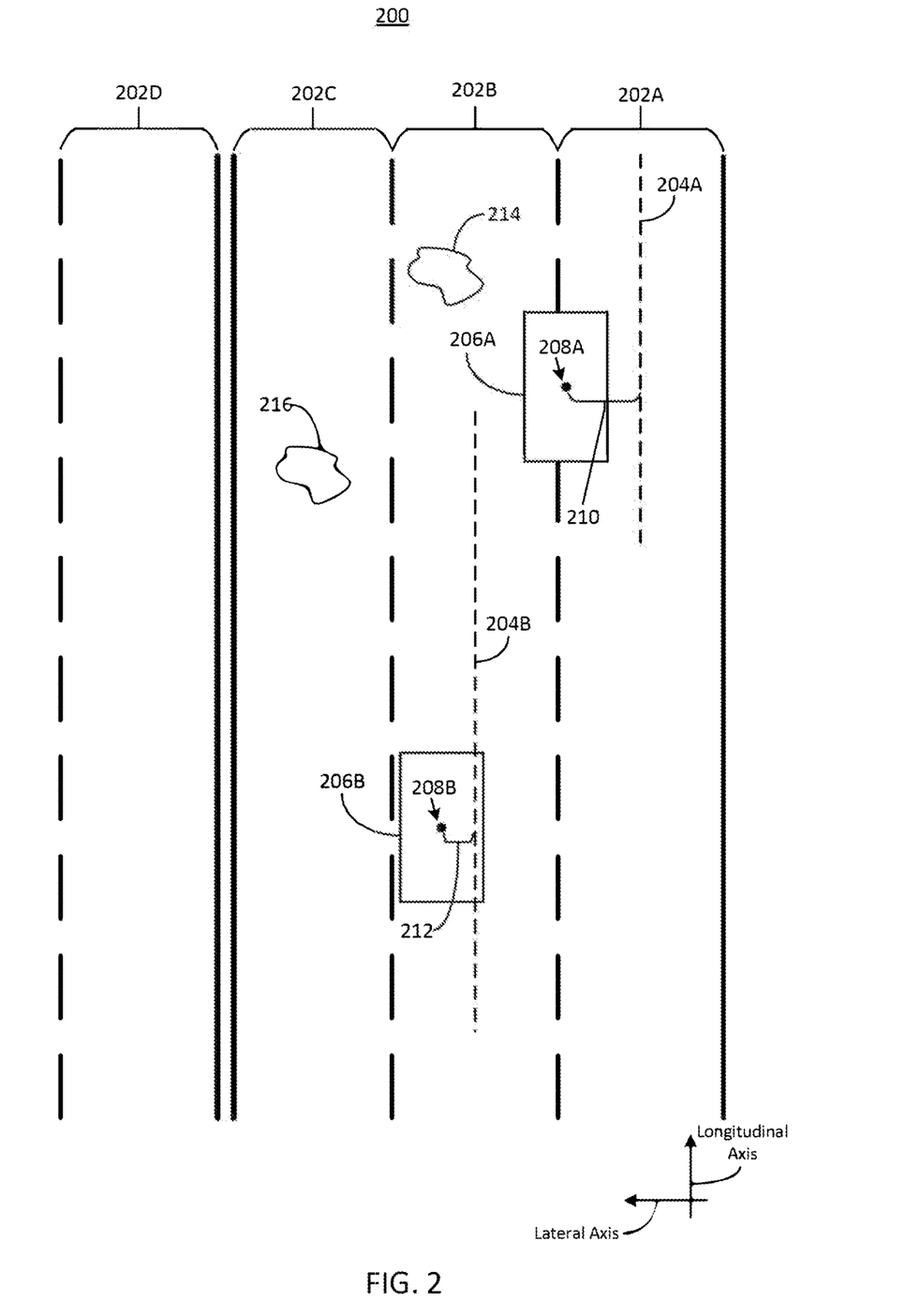
FIG. 2 is an example illustration of localization of vehicles on a road, in accordance with an implementation.

Referring to FIG. 2, an example illustration 200 of localization of vehicles 206A-B on a road is shown. The illustration 200 includes a three lanes road, such as lanes 202A-C, with lane 202D corresponding to the opposing traffic. Line 204A can represent the center of lane 202A and line 204B can represent the center of lane 202B. The point 208A and point 208B can indicate the center of vehicles 206A and 206B, respectively. The vehicles 206A-B can include one or more components (e.g., the DPS 102) similar to vehicle 101, such as in conjunction with FIG. 1. The illustrated road can include irregularities, such as potholes, bumps, etc. shown as irregularities 214 and 216.

The DPS 102 of vehicle 206A can perform lateral localization based on the delta or distance 212 between the center 208A of the vehicle 206A to the center 204B of the lane 202B. The center 208A may be located at any point along the longitudinal axis of the vehicle 206B (e.g., similar to vehicle 206A). The distance 212 from the center 204B of lane 202B can represent the lateral location of the vehicle 206B. The DPS 102 can determine the longitudinal position of the vehicle 206B on the road based on a correlation between a live road profile generated for the vehicle 206B and a predetermined road profile. Accordingly, the DPS 102 can determine the lateral and longitudinal position of the vehicle 206B.

A similar process for determining the lateral and longitudinal position can be performed by the DPS 102 of the vehicle 206A. In this case, the lateral position of the vehicle 206A can be based on the lane 202A and distance 210 from the center of the lane 204A. In some cases, the DPS 102 can determine that the vehicle 206A is in between two lanes (e.g., lanes 202A-B). The DPS 102 may load multiple road profiles based on one or more lanes occupied by the vehicle 206A. The DPS 102 may determine the lateral position of the vehicle 206A based on the distance from the center 208A of the vehicle 206A to the center 204B of lane 202B, for example.

The DPS 102 can alert the vehicles 206A-B of any upcoming irregularities. For example, the DPS 102 can detect that vehicle 206B is approaching irregularity 214. Accordingly, the DPS 102 may alert the driver or passenger (e.g., via at least one of steering wheel vibration, notification on the display device 108, etc.) of the type and severity level of the irregularity 214. In some cases, the DPS 102 may alert the operator of irregularity (e.g., irregularity 216) in one or more other lanes for the operator to avoid multiple irregularities or obstructions. By notifying the operator of irregularities on other lanes, the operator can avoid hitting, colliding with, or interacting with a second irregularity while avoiding a first irregularity. In the case of vehicle 206A, the DPS 102 may identify a lane change from lane 202A to lane 202B. based on the angular acceleration of the vehicle 101 or a turn signal initiated by the operator. The DPS 102 can alert the operator of the irregularity 214 in lane 202B. In some other cases, the DPS 102 can alert the operator based on one or more pedestrians or vehicles being in the path of the vehicle 101, the vehicle 101 straying from a particular lane without a blinker, the vehicle 101 attempting to move to a non-existing lane (e.g., to the right of lane 202A), etc.

Figure 3:
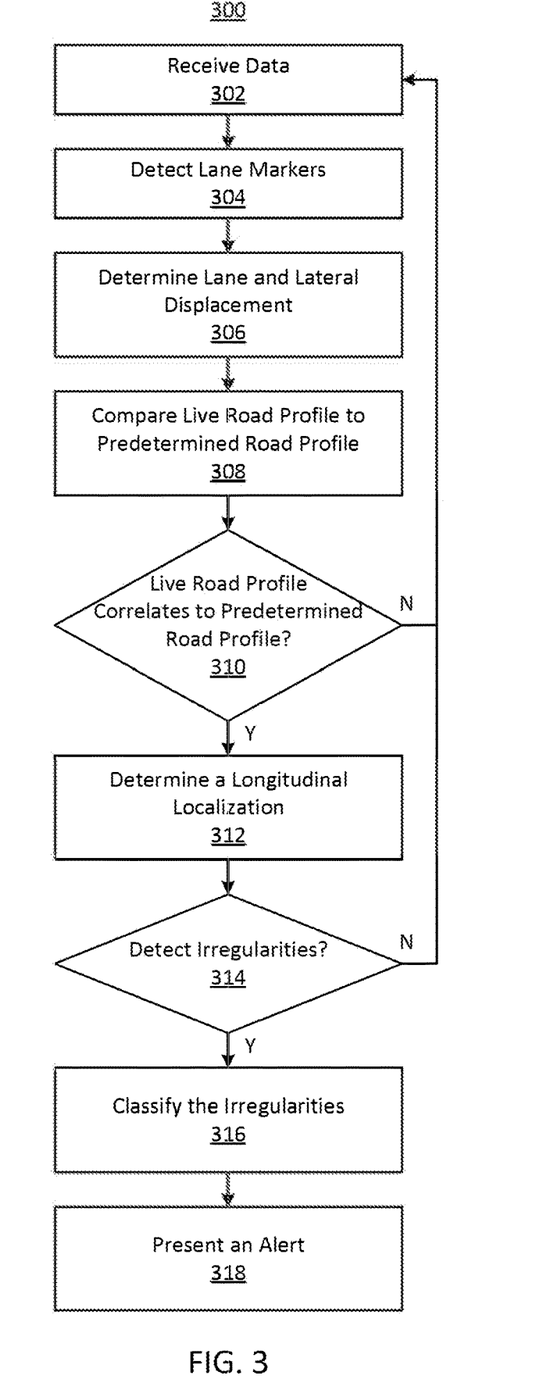
FIG. 3 is a flow diagram of an example method for image-based localization, in accordance with an implementation.

Referring to FIG. 3, a flow diagram of an example method 300 for image-based localization is shown, in accordance with an implementation. The method 300 can be performed or operated using one or more components depicted, for example, at least in FIG. 1 and FIG. 2. In brief overview, at step 302, the DPS can receive data. At step 304, the DPS can detect lane markers. At step 306, the DPS can determine lane and lateral displacement. At step 308, the DPS can compare a live road profile to a predetermined road profile. At step 310, the DPS can determine whether the live road profile correlates to the predetermined road profile. At step 312, the DPS can determine a longitudinal localization. At step 314, the DPS can determine whether an irregularity is detected. At step 316, the DPS can classify the irregularities. At step 318, the DPS can present an alert.

Referring to FIG. 8 in further detail, at step 302, the DPS (e.g., localization module, system, or component) can receive data from one or more sensors of a vehicle. The DPS may retrieve data from a data repository, such as local data storage or remote data storage on a cloud. The data can include one or more of at least raw images from one or more vision sensors, motion sensor data, or lane-level map information. The motion sensor data can include at least one of angular velocity or linear acceleration measured at the center of gravity of the vehicle, the vehicle speed, or acceleration measured at one or more wheels of the vehicle, etc. The center of gravity of the vehicle may be altered based on loads on the vehicle. In some cases, the center of gravity can refer to a location on the vehicle without the load, for example.

The lane-level map information can include information regarding the lane on the road. For example, the lane-level information can include at least one of a number of lanes on the road, a geometry of central lines (or side lines) of the lane indicating a curvature or width of the lane, a style of a marker of the lane, etc. The style of the marker can include or indicate at least one of a color of the marker, dashed marker, solid marker, or width of the marker.

At step 304, the DPS can detect lane markers, such as based on the raw images from the vision sensor or lane-level map information. For example, the DPS can determine the number of lanes, the curvature and width of the lane, or types of markers based on the lane-level map information. The DPS can use a vision detection technique to detect markers of the lane. The vision detection technique can include or correspond to at least one of image segmentation or deep learning technique. In some cases, the DPS can use an object recognition or image processing technique to detect one or more features, such as the lane marking, on the road.

At step 306, the DPS can determine, based on the received or obtained data, a lane in which the vehicle is located and lateral displacement of a center of the vehicle relative to a center of the lane. The center of the lane can refer to a point equidistance laterally from the respective lane lines. In some cases, at least one side (e.g., edge) of the lane may be represented or indicated by a curb, rail, etc.

To determine the lane, the DPS can fuse the received data using a Kalman filter responsive to identifying the lane markers on the road. For example, the DPS can fuse one or more of lane markers information captured by the vision sensor, the lane-level information, and vehicle information (e.g., height, width, etc.) using Kalman filter to determine the lane occupied by the vehicle. In some cases, the DPS can fuse the received data using a multi-sensor data fusion technique to determine the lane. The DPS may provide an indication of the lane determined by the DPS for presentation to the driver or passenger via a display device of the vehicle. For instance, the DPS can generate an interface with the vehicle at a position relative to one or more lane markers. In some cases, the DPS can generate the interface with lane markers associated with other lanes for presentation.

At step 308, the DPS can compare a live road profile to a predetermined road profile. The live road profile can include or correspond to a road profile generated by the DPS responsive to receiving sensor data from one or more sensors of the vehicle. The road profile can include outlines or visual representations of the road or other structures along the road. The road profile can include associated vertical acceleration information specific to the occupying lane and location on the route. The DPS can store the generated live road profile in the local or remote data repository. In some cases, the DPS can replace, update, or modify existing road profile (e.g., the predetermined road profile specific to the lane and location on the map) based on the live road profile.

The DPS can obtain or retrieve the predetermined road profile from the data repository. The DPS can load the predetermined road profile from a map stored in the data repository. For instance, the map can include various road profiles associated with individual lanes and along various routes on the map. The DPS can determine at least one of an approximate location of the vehicle (e.g., using GPS or location sensor) to retrieve the map associated with the location, or a route the vehicle is taking based on navigation information or movement (e.g., location and direction) of the vehicle. In some cases, the DPS can provide a map of one or more road profiles for the lane occupied by the vehicle or one or more additional lanes of the road for presentation to the driver or passenger via the display device.

At step 310, the DPS can determine whether the live road profile correlates to the predetermined or existing road profile. If the road profiles do not correlate, the DPS can revert to step 302 to collect additional sensor data for generating the live road profile. Otherwise, the DPS can proceed to step 312. In some cases, the DPS can search for an existing road profile to correlate with the live road profile based on at least the image data. For instance, the DPS can identify one or more landmarks, lane marking style, the curvature of the road, or other notable indicators (e.g., building structures, environment, etc.) to correlate with an existing road profile.

At step 312, the DPS can determine a longitudinal localization of the vehicle. The DPS can determine the longitudinal localization in response or subsequent to determining the lane occupied by the vehicle. The DPS can determine the longitudinal localization concurrent to determining the lateral displacement. In some cases, the DPS can determine the longitudinal localization responsive to determining the lateral displacement. The longitudinal localization can be based on a correlation of the live estimated road profile and the predetermined road profile of the lane loaded from the map. For example, based on a correlation (e.g., matches or similarities) of one or more elements, features, or information on the road, the DPS can determine the longitudinal position of the vehicle based on the predetermined road profile or a distance and direction from certain indicators (e.g., building, curb, intersection, etc.). The DPS can provide at least one of the longitudinal localization or the lateral localization of the vehicle on the map for presentation on the display device.

At step 314, the DPS can detect one or more irregularities of the live estimated road profile (e.g., live road profile) or the predetermined road profile. The one or more irregularities can include at least one of a pothole, a manhole, a speed bump, an obstruction, etc. For example, the DPS can use the live road profile to detect the one or more irregularities on the road, such as in the occupying lane or other lanes on the road. In this case, the DPS can use object or image recognition processing technique to identify the irregularities. Accordingly, the DPS can proceed to step 316 to determine the severity level of the irregularities, such as whether the vehicle should avoid or whether the irregularity can be ignored.

In another example, the DPS can identify the one or more irregularities included or indicated in the predetermined road profile. For example, the irregularities may be identified by other vehicles prior to the vehicle traversing the road. Hence, based on at least one of the lane information, lateral displacement, and longitudinal localization of the vehicle, the DPS can determine that at least one of the one or more irregularities is in the vehicle path. In this case, the DPS can proceed to step 318 if the irregularities have been classified by one or more other vehicles or devices. Otherwise, the DPS may proceed to step 316. If the DPS does not detect the irregularities, the DPS may proceed to step 302 for further data collection, localization, or road profile generation.

At step 316, the DPS can classify the one or more irregularities into one or more severity levels. The severity level can be ranked alphabetically, numerically, etc., such as from 1 to 10, A to F, low to medium to high, etc. For the purposes of providing an example, there may be three severity levels, such as low severity (e.g., may not be hazardous), medium severity (e.g., may be hazardous to some vehicles, at certain velocities, or angles), and high severity (e.g., hazardous to vehicles and should be avoided). The DPS may use an image processing technique or other recognition technique to determine at least one of the dimensions, shape, or type of irregularity.

For example, the DPS may classify a short speed bump (e.g., less than 3 inches), small pothole (e.g., less than 5 inches in depth and 12 inches in circumference), paper bag, empty box, etc. as low severity. The DPS may classify a medium speed bump (e.g., from 3 inches to 5 inches), medium-sized pothole (e.g., from 5 to 10 inches in depth and from 12 to 20 inches in circumference), a 6 inches circumference tree branch, traffic cone, etc. as medium severity. The DPS may classify a high speed bump (e.g., above 5 inches), a large-sized pothole (e.g., more than 10 inches in depth and larger than 20 inches in circumference), a tree trunk, metal ladder, loose tire on the road, etc. as high severity. The DPS can classify other irregularities, items, or obstructions using other classifying techniques. In some cases, the DPS can classify the one or more irregularities based on rules or policies centralized by the administrator of the DPS, among other DPSs. The DPS can categorize the severity using other techniques or level standards.

At step 318, the DPS can present an alert to a user (e.g., operator, driver, or passenger) of the vehicle. The alert can indicate the one or more irregularities and the corresponding one or more severity levels. The alert can include at least one of a visual alert, an audio alert, or a haptic alert, etc. The visual alert can be provided on the display device of the vehicle. For example, the DPS can generate a preview or a graphical interface for presentation on the display device showing at least the locations of the irregularities (e.g., lane, lateral position, or longitudinal position), distance from the vehicle, types of the irregularities, severity levels of the irregularities, etc. In some cases, the DPS can provide an augmented or navigation interface recommended to avoid the irregularities, such as a suggestion to move to a different lane, decelerate, proceed with caution, increase lateral displacement to left or right side, etc.

The audio alert can include at least one of notification sound or voice message. For example, the notification sound can be based on the type of irregularities, such as pothole, manhole, bumps, etc. In another example, the voice message can indicate information regarding the irregularities (e.g., type or severity level). The haptic alert can be applied to at least one of the steering wheel, seat, pedal, etc. of the user. Accordingly, by providing alerts discussed herein to the user, the DPS can enhance the safety, driving experience, and longevity of the vehicle.

Figure 4:
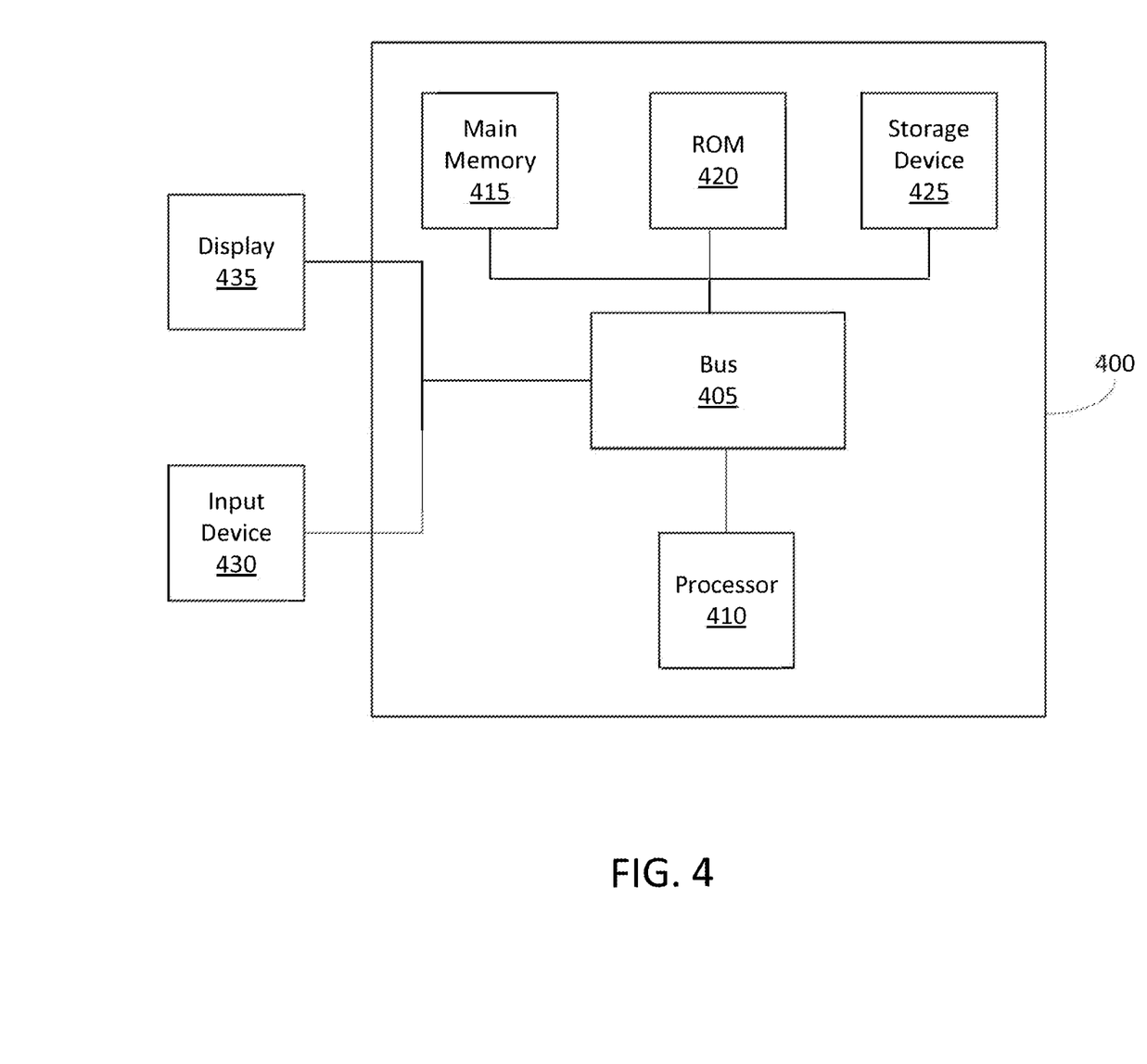
FIG. 4 is a block diagram illustrating an architecture for a computer system that can be employed to implement elements of the systems, methods, and apparatus described and illustrated herein, including, for example, the systems and apparatus depicted in FIGS. 1-2, and the method depicted in FIG. 3.

FIG. 4 is a block diagram of an example computer system 400. The computer system or computing device 400 can include or be used to implement one or more components of system 100 or perform one or more aspects of the method 300. For example, the system 400 can implement one or more components or functionality of the system 100, the DPS 102, the vehicle 101, or the server 104. The computing system 400 includes at least one bus 405 or other communication components for communicating information and at least one processor 410 or processing circuit coupled to the bus 405 for processing information. The computing system 400 can also include one or more processors 410 or processing circuits coupled to the bus for processing information. The computing system 400 also includes at least one main memory 415, such as a random access memory (RAM) or other dynamic storage devices, coupled to the bus 405 for storing information, and instructions to be executed by the processor 410. The main memory 415. The main memory 415 can also be used for storing one or more of a propeller control program, tank map, collected data, tank inspection process, quality metric, diagnostic program, or other information. The computing system 400 may include at least one read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 124 or a remote data repository.

The computing system 400 may be coupled via the bus 405 to a display 435, such as a liquid crystal display, or active matrix display, for displaying information to an operator of the vehicle 101. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 (e.g., on a vehicle dashboard) can, for example, be part of the DPS 102, vehicle 101, or other component depicted herein. The display may correspond to the display device 108 of the vehicle 101.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The subject matter including the operations described in this specification can be implemented in digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the data processing system, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing system" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations may be depicted or referred to in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to perform localization of a vehicle, comprising:
a data processing system, comprising one or more processors and memory, to:
receive data comprising one or more of: raw images from one or more vision sensors, motion sensor data, or lane-level map information;
execute, based on the data, a vision technique to detect markers of a lane, wherein the vision technique comprises at least one of image segmentation or deep learning;
determine, in response to execution of the vision technique and based on the detected markers, a lane in which the vehicle is located and lateral displacement of a center of the vehicle relative to a center of the lane;
compare a predetermined road profile of the lane with an estimated road profile generated using the data;
detect, subsequent to the comparison, one or more obstructions in the estimated road profile or the predetermined road profile, wherein the one or more obstructions are with respect to the lane and the lateral displacement of the center of the vehicle; and
cause, responsive to the detection of the one or more obstructions, the vehicle to perform at least one action based on the one or more obstructions associated with the lane and the lateral displacement.

2. The system of claim 1, wherein the data processing system is further configured to:
receive the motion sensor data comprising at least one of:
angular velocity and linear acceleration measured at a center of gravity of the vehicle;
a vehicle speed; or
acceleration measured at one or more wheels of the vehicle.

3. The system of claim 1, wherein the data processing system is further configured to:
receive the lane-level map information comprising at least one of:
a number of lanes on the road,
a geometry of central lines of the lane indicating a curvature or width, or
a style of a marker of the lane indicating at least one of a color of the marker, dashed marker, solid marker, or width of the marker.

4. The system of claim 1, wherein the data processing system is further configured to:
fuse the received data using a Kalman filter to determine the lane.

5. The system of claim 1, wherein the data processing system is further configured to:
fuse the received data using a multi-sensor data fusion technique to determine the lane.

6. The system of claim 1, wherein the data processing system is further configured to:
provide, for presentation via a display device of the vehicle, an indication of the lane determined by the data processing system.

7. The system of claim 1, wherein the data processing system is further configured to:
provide, for presentation via a display device of the vehicle, a map of road profiles for the lane and one or more additional lanes of the road.

8. The system of claim 1, wherein the data processing system is further configured to:
determine a longitudinal localization based on a correlation of the live estimated road profile and the predetermined road profile of the lane loaded from a map.

9. The system of claim 8, wherein the data processing system is further configured to:
detect the one or more obstructions of the estimated road profile or the predetermined road profile, the one or more obstructions comprising at least one of a pothole, a manhole, or a speed bump; and
classify the one or more obstructions into one or more severity levels,
wherein to perform the at least one action, the data processing system is configured to:
present an alert to a user of the vehicle indicating the one or more obstructions and the corresponding one or more severity levels, the alert comprising at least one of a visual alert, an audio alert, or a haptic alert; or
adjust, according to the one or more obstructions and the one or more severity levels, a configuration of the vehicle to assist the user in avoiding the one or more obstructions, wherein the configuration comprises at least one of: a steering control, a braking coefficient, or a suspension setting.

10. A method of performing localization of a vehicle, comprising:
receiving, by a data processing system, data comprising one or more of: raw images from one or more vision sensors, motion sensor data, or lane-level map information;
executing, by the data processing system based on the data, a vision technique to detect markers of a lane, wherein the vision technique comprises at least one of image segmentation or deep learning;
determining, by the data processing system in response to execution of the vision technique and according to the detected markers, a lane in which the vehicle is located and lateral displacement of a center of the vehicle relative to a center of the lane;
comparing, by the data processing system, a predetermined road profile of the lane with a live estimated road profile generated using the data;
detecting, by the data processing system subsequent to the comparison, one or more obstructions in the live estimated road profile or the predetermined road profile, wherein the one or more obstructions are with respect to the lane and the lateral displacement of the center of the vehicle; and causing, by the data processing system responsive to the detection of the one or more obstructions, the vehicle to perform at least one action based on the one or more obstructions associated with the lane and the lateral displacement.

11. The method of claim 10, comprising:
receiving, by the data processing system, the motion sensor data comprising at least one of:
   angular velocity and linear acceleration measured at a center of gravity of the vehicle;
   a vehicle speed; or
   acceleration measured at one or more wheels of the vehicle.

12. The method of claim 10, comprising:
receiving, by the data processing system, the lane-level map information comprising at least one of:
   a number of lanes on the road,
   a geometry of central lines of the lane indicating a curvature or width, or
   a style of a marker of the lane indicating at least one of a color of the marker, dashed marker, solid marker, or width of the marker.

13. The method of claim 10, comprising:
fusing, by the data processing system, the received data using a Kalman filter to determine the lane.

14. The method of claim 10, comprising:
fusing, by the data processing system, the received data using a multi-sensor data fusion technique to determine the lane.

15. The method of claim 10, comprising:
providing, by the data processing system for presentation via a display device of the vehicle, an indication of the lane determined by the data processing system.

16. The method of claim 10, comprising:
providing, by the data processing system for presentation via a display device of the vehicle, a map of road profiles for the lane and one or more additional lanes of the road.

17. The method of claim 10, comprising:
determining, by the data processing system, a longitudinal localization based on a correlation of the live estimated road profile and the predetermined road profile of the lane loaded from a map.

18. The method of claim 17, comprising:
detecting, by the data processing system, the one or more obstructions of the live estimated road profile or the predetermined road profile, the one or more obstructions comprising at least one of a pothole, a manhole, or a speed bump; and
classifying, by the data processing system, the one or more obstructions into one or more severity levels,
wherein performing the at least one action comprises:
   presenting, by the data processing system, an alert to a user of the vehicle indicating the one or more obstructions and the corresponding one or more severity levels, the alert comprising at least one of a visual alert, an audio alert, or a haptic alert; or
   adjusting, by the data processing system according to the one or more obstructions and the one or more severity levels, a configuration of the vehicle to assist the user in avoiding the one or more obstructions, wherein the configuration comprises at least one of: a steering control, a braking coefficient, or a suspension setting.

* * * * *